July 3, 1934.  A. M. CRAMER  1,965,069
LIQUID DISPENSING DEVICE
Filed June 22, 1933   2 Sheets-Sheet 1
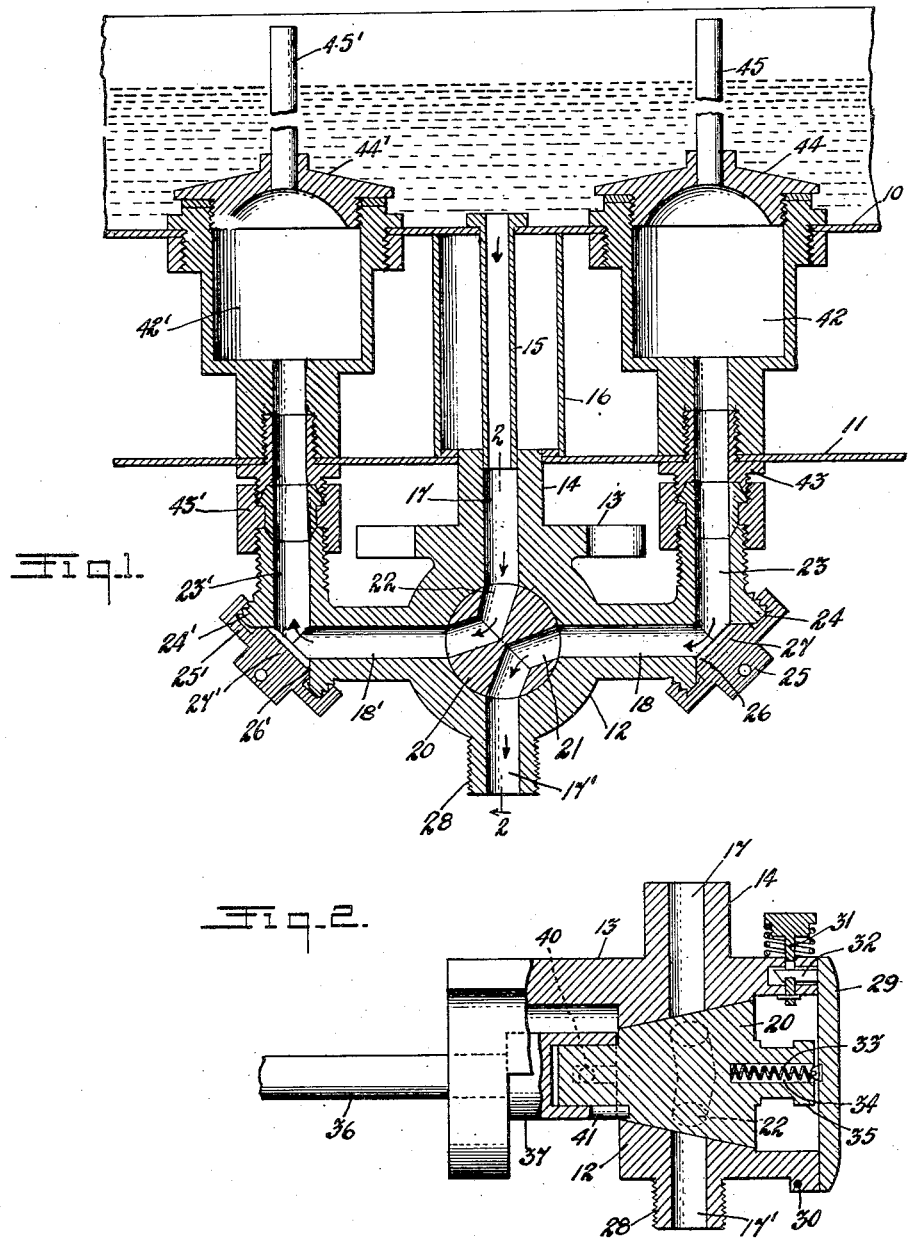
WITNESSES:
INVENTOR
Albert M. Cramer
BY
Joshua R H Potts
HIS ATTORNEY July 3, 1934.    A. M. CRAMER    1,965,069
LIQUID DISPENSING DEVICE
Filed June 22, 1933    2 Sheets-Sheet 2

WITNESS:

INVENTOR
Albert M. Cramer
BY
HIS ATTORNEY

Patented July 3, 1934

1,965,069

UNITED STATES PATENT OFFICE 1,965,069

LIQUID DISPENSING DEVICE

Albert M. Cramer, Philadelphia, Pa., assignor to Horn & Hardart Baking Company, Philadelphia, Pa., a corporation of New Jersey Application June 22, 1933, Serial No. 677,053

7 Claims. (Cl. 221—100)

This invention relates to liquid dispensing devices, and has for an object to provide improved means for dispensing liquids which shall present new and improved features adapting it for sanitary cleansing.

A further object of the invention is to provide a liquid dispensing device so arranged that the several passages therein are in such alignment that each may be reached and thoroughly cleansed by a brush or similar article inserted therethrough.

It is well-known that in the dispensing of such fluid articles as milk, great care must be exercised in sanitation of the dispensing device to prevent contamination of the liquid. Some States even have laws governing such dispensing apparatus and only approved dispensing apparatus may be used under such legal regulations.

The present invention is, therefore, directed to a dispensing device having measuring cups for measuring a predetermined liquid supply, so arranged that as one of said cups is discharging, another cup will be filling, so that at all times the device is in readiness to deliver a predetermined measured quantity, and that all of said parts entering into said combination will be so arranged that access may be had thereto for thorough sanitary cleaning.

The drawings illustrate an embodiment of the invention and the views therein are as follows:

Figure 1 is a view of the device in vertical section,

Figure 2 is a sectional view taken on line 2—2 of Figure 1,

Like characters of reference indicate corresponding parts throughout the several views.

Figure 3:
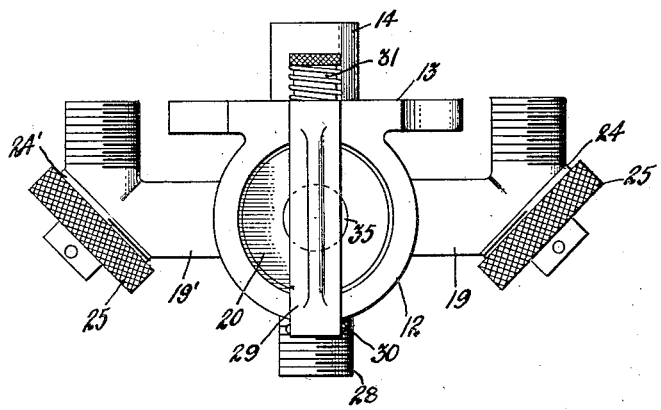
Figure 3 is a view of the valve structure of the dispensing device seen in end elevation.
Figure 4:
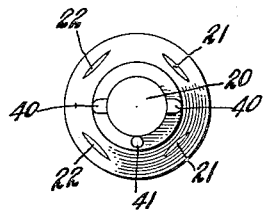
Figure 4 is a view in end elevation of the valve body.
Figure 5:
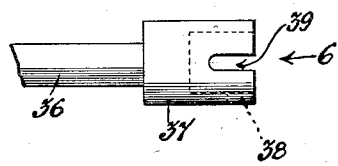
Figure 5 is a view in side elevation of the valve operating spindle.
Figure 7:
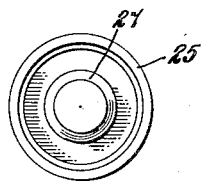
Figure 7 is a view in elevation of one of the closure caps.
Figure 6:
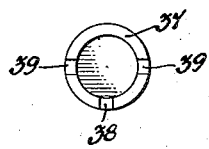
Figure 6 is a view in end elevation of the valve operating spindle, as indicated by arrow 6 at Figure 5.

The dispensing device as an entirety will include an urn or reservoir 10. This may be of any size and located in any convenient position. As shown, it is located directly above the valve structure, but it is to be understood that it may be located elsewhere and still accomplish its purpose. A supporting member or false bottom 11 is also shown.

Located beneath the reservoir is a valve housing 12 having a plate part 13 by which the device may be attached to any structure desired, no supporting structure being shown in the drawings. The valve housing 12 has a nipple 14 which communicates with the urn 10 through a passage 15. A sleeve 16 surrounds this passage for the purpose of insulation.

The valve housing is constructed primarily as a cross having a passage 17 and 17' which is a vertical passage, and the transverse passage 18 and 18', the latter being located within the lateral arms 19 and 19'.

At the juncture of the passages 17 and 18, a valve 20 is mounted. Said valve is a tapered valve and mounted in a tapered valve seat, and is provided with passages 21 and 22 which, upon oscillation, may communicate, respectively, with the passages 17 and 18' and the passages 17' and 18, or with the passages 17 and 18, 18' and 17'.

These passages 18 and 18' extend substantially in alignment and vertical passages 23, 23' junction therewith. At the junction a threaded boss 24 or 24' is provided with a screw cap 25 or 25', each cap provided with a frustro-conical part 26 or 26' which makes sealing contact with the tapered bore 27 or 27'. The opening thus provided makes direct communication with the passages 18 or 18' in one direction, the passages 23, 23' in a different direction.

The valve housing is provided with a nipple 28 by which a conduit may be attached for conveyance of the dispensed liquid to a distant point. The valve 20, as noted, being tapered, may be easily removed from its valve housing and for the purpose of this removal, a bar 29 is hinged at 30 and has a latch comprising the spring pressed detent 31 and the pawl 32. The bar 29 carries a spring 33 which is inserted into an axial recess 34 in the valve.

When the bar 29 swings outwardly upon its fulcrum 30 by the actuation of the latch, the spring 34 is carried by the bar and is released from its tensioning engagement with the valve. The valve may be, therefore, manually removed, a knurled head 35 being provided for convenience of handling.

For actuating the valve a spindle 36 is provided, to which may be attached any mechanical or manual means for actuation. This stem 36 is provided with a sleeve 37 which is slotted at 38, and with deeper diametrical slots 39, the latter being positioned at 90° relative to the slot 38.

The valve carries diametrically extending pins 40 properly proportioned to fit into the slots 39, and a pin 41 extending parallel to the axis of the valve and properly positioned and proportioned to fit into the slot 38. By this arrangement the valve can only be connected with the sleeve 37 and spindle 36 in predetermined relation, so that the governing of the spindle in a predetermined manner will govern the rotation of the valve so that the passages will make proper communication.

The passage 23 communicates with a measuring cup 42 and the passage 23' with a measuring cup 42'. These measuring cups may be as shown, directly over the valve structure, or may communicate therewith through any approved or convenient conduits, simple unions 43 and 43' being indicated here merely as illustrative.

The cups 42 and 42' are provided with screw caps 44 and 44'. The caps 44, 44' are provided with vent tubes 45, 45', which are of such length as to reach above the liquid level within the urn 10.

The operation of this device for dispensing is substantially the same as that disclosed in the patent to John Fritsche, No. 1,483,083, of February 12, 1924, the present structure being designed as an improvement upon that structure, for the purpose of more complete sanitary cleansing.

The operation, however, will be briefly described. The liquid from the urn will pass downwardly through the conduit 15, as indicated by the arrow in such conduit, and through the several passages 22, 18', 23' to the cup 42', filling said cup and vent to the level of the liquid within the urn. Simultaneously, the liquid contained in the cup 42 passes, as indicated by the arrows, through the passages 23, 18, 21 to the discharge nipple 28. By the reversal of the valve 20, the run of the passages is reversed and at such reversal the liquid from the urn will flow through the passages into the cup 42, while the cup 42' is discharging.

The present invention, however, is directed more particularly to the arrangement whereby complete sanitary cleansing may be accomplished. By the swinging of the bar 29, as above described, the valve 20 may be bodily removed from the housing and the angle of the passages 21 and 22 therethrough are such that a brush or other cleansing implement may be readily passed through. But the valve itself may be immersed in any cleansing or germicidal bath, as desired.

When so removed, the caps 25, 25' will likewise be removed and may also be subjected to cleansing by immersion or by the use of a brush, or other implement.

The passages are now all completely opened for the introduction of brushes charged with cleansing liquid. A brush may be, therefore, passed through the passage 23' through the union, and upwardly into the cup 42'. A brush may also be passed upwardly through the passages 17, 17' and conduit 15. A brush may also be passed through the conduits 18, 18'. The caps 44, 44' may be readily removed from the cups 42, 42' and all cleansed.

By such a structure a device is provided, every part, conduit and passage of which is readily cleansable for the purpose of complete antisepticizing.

Of course the liquid dispensing device herein illustrated may be modified and changed in various ways without departing from the invention herein set forth and hereafter claimed.

I claim:—

1. In a liquid dispensing device a reservoir, a passage from said reservoir, a valve controlling said passage, measuring devices, other conduits communicating with the measuring devices and put into communication alternately with said measuring devices, and an exit port, all of said conduits being so aligned that an implement may pass therethrough in a substantially straight line.

2. In a liquid dispensing device, a valve structure having a conduit therethrough, one part of which is perpendicular to another part, and a cap closing an opening positioned at the junction of said conduit sections, said opening forming straight lined communication with both of said conduit sections.

3. A liquid dispensing device comprising spaced measuring receptacles, a pair of parallel conduits extending downwardly from said receptacles, a conduit intermediate and parallel with said pair of conduits, alined lateral conduits connecting the lower ends of said pair of conduits with the intermediate conduit, means at the junctions of the pair of conduits and the lateral conduits removable to afford access simultaneously to both converging conduits, and a valve at the junction of the intermediate and lateral conduits removable to afford access to the conduits through said valve space both vertically and laterally.

4. A liquid dispensing device comprising spaced measuring receptacles, a pair of parallel conduits extending downwardly from said receptacles, a conduit intermediate and parallel with said pair of conduits, a reservoir in communication with said intermediate conduit, alined lateral conduits connecting the lower ends of said pair of conduits with the intermediate conduit, means at the junctions of the pair of conduits and the lateral conduits removable to afford access simultaneously to both converging conduits, and a valve at the junction of the intermediate and lateral conduits removable to afford access to the conduits through said valve space both vertically and laterally.

5. A liquid dispensing device comprising spaced measuring receptacles, a pair of parallel conduits extending downwardly from said receptacles, a conduit intermediate and parallel with said pair of conduits, alined lateral conduits connecting the lower ends of said pair of conduits with the intermediate conduit, caps angularly positioned at the junctions of the pair of conduits and the lateral conduits removable to afford access simultaneously to both converging conduits, and a valve at the junction of the intermediate and lateral conduits removable to afford access to the conduits through said valve space both vertically and laterally.

6. A liquid dispensing device comprising spaced measuring receptacles, a pair of parallel conduits extending downwardly from said receptacles, a conduit intermediate and parallel with said pair of conduits, alined lateral conduits connecting the lower ends of said pair of conduits with the intermediate conduit, means at the junctions of the pair of conduits and the lateral conduits removable to afford access simultaneously to both converging conduits, and a valve at the junction of the intermediate and lateral conduits adapted to variously interconnect said conduits and removable to afford access to the conduits through said valve space both vertically and laterally.

7. A liquid dispensing device comprising spaced measuring receptacles, a pair of parallel conduits extending downwardly from said receptacles, a conduit intermediate and parallel with said pair of conduits, a reservoir in communication with said intermediate conduit, alined lateral conduits connecting the lower ends of said pair of conduits with the intermediate conduit, caps angularly positioned at the junctions of the pair of conduits and the lateral conduits removable to afford access simultaneously to both converging conduits, and a valve at the junction of the intermediate and lateral conduits adapted to variously interconnect said conduits and removable to afford access to the conduits through said valve space both vertically and laterally.

ALBERT M. CRAMER.